W. C. PHILBRICK.

Fire-Kindler.

No. 6,472. Reissued June 1, 1875.

Attest:

A. H. Norris

J. S. Coombs

Inventor.

Warren C. Philbrick.

By James L. Norris.

Atty.

UNITED STATES PATENT OFFICE.

WARREN C. PHILBRICK, OF LYNN, MASSACHUSETTS, ASSIGNOR TO JOSEPH D. HUSBANDS, JR., OF ST. LOUIS, MISSOURI.

IMPROVEMENT IN FIRE-KINDLERS.

Specification forming part of Letters Patent No. 73,922, dated January 28, 1868; reissue No. 6,472, dated June 1, 1875; application filed May 13, 1875.

*To all whom it may concern:*

Be it known that I, WARREN C. PHILBRICK, of Lynn, in the county of Essex and State of Massachusetts, have invented certain new and useful Improvements in Fire-Kindlers, of which the following is a specification:

This invention relates to fire-kindlers, its object being to furnish a cheap and efficient substitute for the ordinary split-wood kindling, and to construct a fire-kindler which will allow a rapid circulation of oxygen or air and flame into or through the same, for the purpose of supporting combustion and preventing smothering of the flame.

To this end my invention consists, first, in constructing a fire-kindler from a block of suitable material, with a series of draft-flues or air-passages for admitting a draft into and through the block, to intensify the heat and prevent smothering of the flame, this being due to the draft in the flues or air-passages, causing the flame to be carried into said flues, and thereby generating an intense heat, which will effectually kindle fires, whether coal or wood is used as the fuel; second, in the combination, in a fire-kindler composed of a block of suitable material, of beveled sides for supporting and retaining the fuel away from the sides of the block, and air-passages or draft-flues for permitting a free circulation of air around and through the same.

Figure 1:
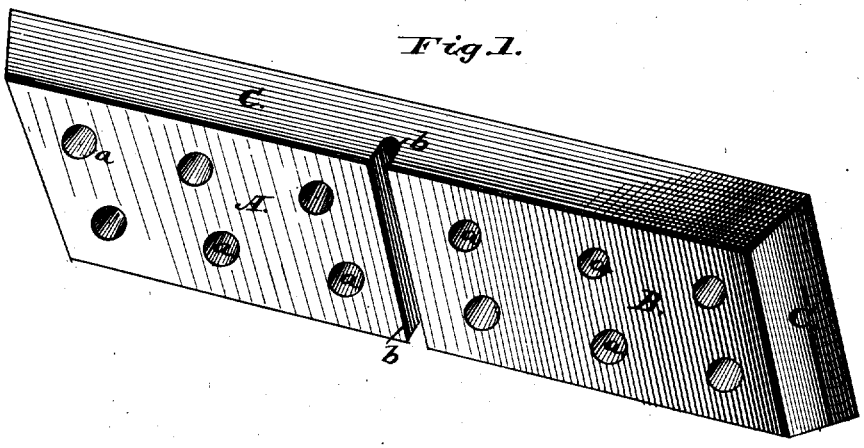
Figure 2:
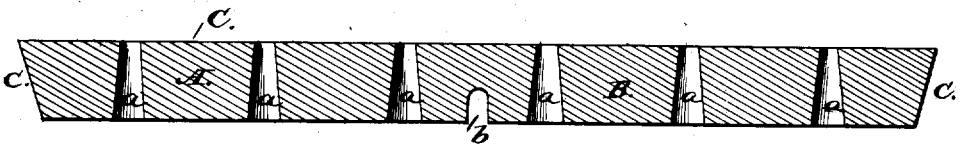

In the accompanying drawings, Figure 1 represents a perspective view of a fire-kindler constructed from a block of suitable material, and having a series of air-passages or draft-flues. Fig. 2 is a longitudinal vertical section of the same.

Referring to the accompanying drawings, the letter B represents a block of suitable material, which is constructed with a series of air-passages or draft-flues, *a*, which pass entirely through said block, in such manner that when the block or kindler is ignited and placed upon a fire-grate, or in any other spot where it is desired to build a fire, the air-passages or draft-flues will conduct the draft and flame into and through said passages, and thereby generate an intense heat and obviate any liability of smothering the flame.

The blocks or kindlers may be constructed with beveled edges, as shown at C, which are specially designed to support and retain the fuel on the upper surface of the block, or away from the sides of the kindler, and thereby prevent the burning surfaces from being clogged, and affording a free circulation of air or draft around the block to aid in supporting combustion.

In the present example the blocks or kindlers are composed of a composition of charcoal-dust or comminuted charcoal, fine or pulverized anthracite or bituminous coal, rosin, coal or gas tar, and wood sawdust from soft or hard wood.

In compounding these ingredients the rosin and coal or gas tar are first melted together, and with these are added the remaining ingredients above specified. These materials are mixed and incorporated together in such proportions as to form a composition of proper consistency, intended to be cast or molded into blocks or kindlers having air-passages or draft-flues, as before mentioned.

When the fire-kindlers are molded or cast in blocks of large size, intended to be separated into more than one kindler, I construct the mold so as to produce in the block a groove or indentation, *b*, which will serve as a guide, and facilitate the division of the block into blocks of the required size.

By constructing a fire-kindler from a block of suitable material, with a series of air-passages or draft-flues, a draft is admitted into and through the block, which has the effect of generating an intense heat, and effectually prevents smothering of the flame, and such a block will kindle any fire without regard to the fuel employed, whether it be coal or wood; and, moreover, the draft impelling the flame against the block intensifies the heat, and secures a bed of coals as a basis for the fuel, the entire combustion of the material forming the kindler, as well as the intense heat, being entirely due to the provision of air-passages or flues for creating a draft, and by the presence of such effectually preventing and rendering it almost impossible to smother the flame.

Having thus described my invention, what I claim as new, and desire to secure by Letters Patent, is—

1. A fire-kindler constructed from a block of suitable material, with a series of air-passages or draft-flues for admitting the draft into and through the block, to intensify the heat and support combustion.

2. The combination, with a fire-kindler having beveled sides for affording a circulation of air around the kindler, of draft-flues or air-passages for permitting a draft into and through the kindler, substantially as described.

In testimony that I claim the above I have hereunto set my hand and seal this 28th day of April, A. D. 1875.

WARREN C. PHILBRICK. [L. S.]

Witnesses:

JAMES R. NEWHALL,
A. M. FRENCH,
E. C. NEWHALL.